Feb. 28, 1956 W. M. SCHOLL 2,736,109
LAMINATED INSOLE
Filed June 6, 1951
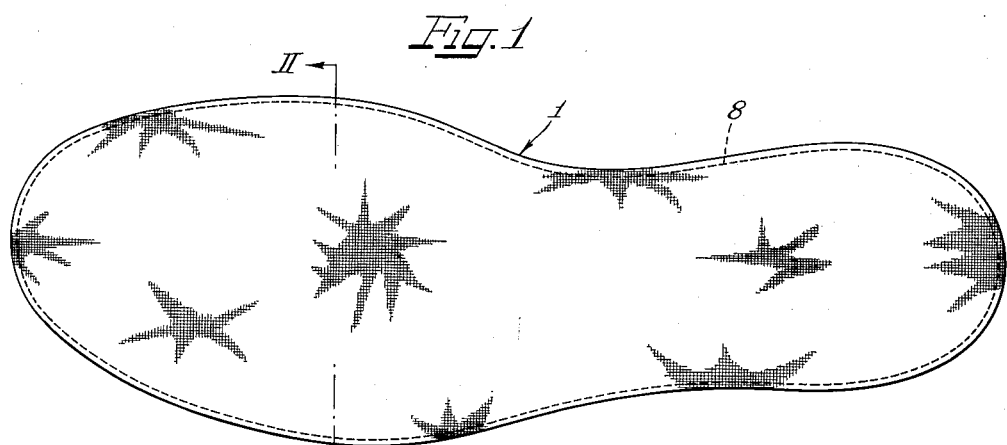
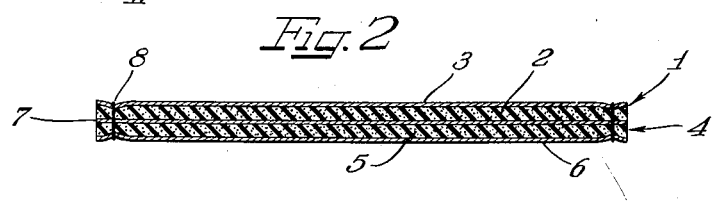
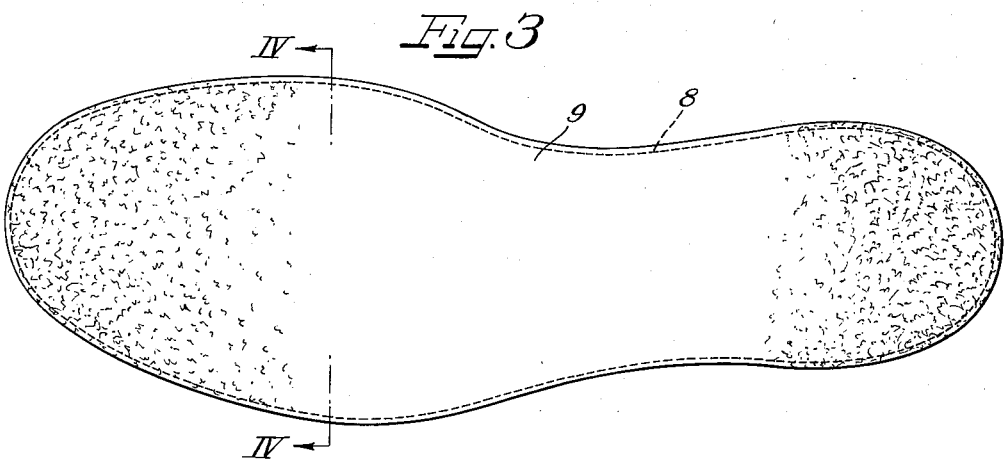
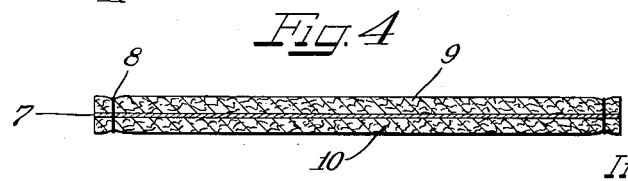
Inventor
William M. Scholl
by
Attys United States Patent Office 2,736,109
Patented Feb. 28, 1956

2,736,109
LAMINATED INSOLE
William M. Scholl, Chicago, Ill.
Application June 6, 1951, Serial No. 230,216
1 Claim. (Cl. 36—44)

This invention relates to improvements in a laminated insole, and more particularly to an insole for free disposition in an article of footwear such as a shoe, boot, or the like, and which may be removed and reinserted whenever desired, although the invention may have other uses and purposes as will be apparent to one skilled in the art.

In the past, many and various types of insoles for free disposition in an article of footwear have been developed, but in no instance of which I am aware has a laminated insole been produced, and particularly one of cushioning material, wherein a heat reflecting medium was employed as an intermediate lamination. Consequently, insoles as heretofore made were not as cushioning, as flexible, and as both heat and moisture insulating as may be desired.

With this in mind, it is an important object of the instant invention to provide a laminated insole embodying an intermediate lamination of metallic foil.

Another object of the invention is the provision of a laminated insole embodying an intermediate lamination of relatively thin flexible but heat reflecting material.

Still a further feature of the invention resides in the provision of laminated insoles in which the intermediate lamination is both heat reflecting and moisture impervious, and which insoles are interchangeable from one shoe to another by inverting them.

Another feature of the invention resides in the provision of a laminated insole which is interchangeable by inversion from one shoe to another, and which is substantially identical in appearance and structure on both faces.

It is another feature of the invention to provide a laminated insole so constructed that heat from the ground passing through the shoe sole is reflected back toward the ground and away from the foot, while heat from the foot may be reflected back toward the foot.

Still another feature of the insole of this invention is the provision of a laminated insole so constructed that certain laminations thereof may be made from material heretofore found unstable for this purpose, and by virtue of the construction of the insole, such material is kept stable to function indefinitely in an insole.

While some of the more salient features, characteristics and advantages of the instant invention have been above pointed out, others will become apparent from the following disclosures, taken in conjunction with the accompanying drawing, in which—

Figure 1 is a plan view of an insole embodying features of the instant invention;

Figure 2 is an enlarged transverse vertical sectional view taken substantially as indicated by the line II—II of Fig. 1, looking in the direction of the arrows;

Figure 3 is a plan view of an insole embodying principles of the instant invention, but made of different material as to certain laminations from the insole seen in Figs. 1 and 2; and Figure 4 is an enlarged transverse vertical sectional view taken substantially as indicated by the line IV—IV of Fig. 3.

As shown on the drawings:

In that illustrated embodiment of the instant invention seen in Figs. 1 and 2, there is shown an insole of substantially the same thickness throughout and of a size to fit beneath the entire plantar surface of a human foot. While it is not essential that an insole constructed in accordance with this invention be of such size, and while it is not essential that it does not vary in thickness but may employ suitable elevations for supporting the respective arches of the foot, it is preferable to have the insole of that particular size and structure if the moisture impervious and heat reflecting qualities are to be preserved to the best advantage.

This embodiment of the invention comprises an insole made of a plurality of laminations, in the illustrated instance there being three such laminations. The top lamination 1 comprises a relatively thick sheet 2 of foam latex having a relatively smooth and thinner fabric covering sheet 3 vulcanized or equivalently secured thereto. The lower lamination, generally indicated by numeral 4, is of the same construction as the top lamination and includes a sheet of foam latex 5 and a similar fabric covering 6.

Between the two composite laminations 1 and 4 is an intermediate lamination 7 of heat reflecting and moisture impervious material. A satisfactory material for this lamination is metal foil.

Of course, the upper and lower laminations may be cemented, if so desired, to the upper and lower faces of the intermediate impervious lamination 7 by any suitable form of cementitious material. Likewise, in the case of foam rubber contacting an intermediate metallic lamination a vulcanizing process is satisfactory. In the illustrated instance I have shown a line of stitching 8 extending entirely around the marginal portion of the insole to hold the laminations together, and this stitching is applied in such a manner as not to detract from the moistureproof quality of the insole, whenever that moistureproof quality is mainly desired. The stitching may or may not be used along with a cementitious material, but obviously the stitching is not necessary in the case of vulcanization.

In Figs. 3 and 4 I have illustrated a laminated insole made of different material insofar as the upper and lower laminations are concerned. In this instance, upper and lower laminations 9 and 10 are alike in material and thickness, and are made of relatively thick felt-like material. The intermediate lamination may be of the same character as the lamination 7 above described, and the laminations may be cemented to the intermediate lamination if so desired, or the aforesaid line of stitching 8 may be employed singly or along with the cementitious material as deemed most desirable.

It will be noted that in both the illustrated instances the insoles are of a cushioning character, affording shock absorbing relief to the foot during walking.

The materials selected for illustrative purposes are not the only materials from which a satisfactory insole embodying the advantages of the instant invention may be made. Other materials, by way of example and not by way of limitation, could be cotton felt, or cotton in various other forms, natural or synthetic fibers, thermoplastic or thermosetting plastic materials, either sponge or foam rubber, cork, cork associated with a suitable binder, etc. The intermediate lamination, while preferably metallic foil, might also be made of certain thermoplastic or thermosetting plastic material.

Some of the advantages of the instant invention include the following:

When the insole is in use, the foot remains warm, due to the fact that the heat reflecting intermediate lamination 7 will reflect back toward the foot some of the heat given off by the foot.

In hot weather, or when in use over heated surfaces, the foot tends to remain cooler, because the excessive heat emanating from the ground or heated surface is reflected away from the foot by the bottom surface of the intermediate lamination.

Should moisture enter through the bottom of the article of footwear, the impervious character of the intermediate lamination permits only the lamination or laminations therebelow to become wetted, maintaining the foot dry.

By the same token, should the upper portion of the insole become wetted by moisture exuding from the foot, a dry surface for that foot can readily be provided by removing both insoles from the shoes, inverting them, and placing them in opposite shoes from their previous disposition.

The top and bottom laminations may be made of material which ordinarily would be unstable if used as an insole for a shoe or the like, and the intermediate lamination 7 will keep such material stable, especially with respect to size.

Also, the insoles may be made from extremely soft and pliable material wherein the intermediate lamination 7 will maintain that material resistant to wrinkling.

In addition, should friction occur between a small localized area of the plantar surface of the foot and an insole, such friction produces heat and tends to bring about an uncomfortable burning sensation to the user. While the particular insole will not prevent such an occurrence, yet the intermediate lamination 7, especially if made of metallic foil, will tend to transfer a noticeable amount of that heat away from the localized area, and thus reduce the uncomfortable burning sensation accordingly.

It will be especially noted, that the instant invention may be very economically manufactured, is exceptionally long lived, and rendered more comfortable to the user by virtue of its identical appearance on each side, whereby it may be used in either shoe.

It will be understood that modifications and variations may be effected without departing from the scope of the novel concepts of the present invention.

I claim as my invention:

A reversible insole for free disposition in an article of footwear comprising a ball portion, a shank portion and a heel portion, said ball, shank and heel portions consisting of a thin sheet-form member made of metal foil providing continuous upper and lower moisture impervious, heat reflective surfaces, a top cushioning member made of a layer of foam latex coextensive in area with said metal sheet-form member and being relatively thick with respect to said metal sheet-form member to provide a top shock absorber on one side of said metal sheet-form member, a bottom cushioning member made of a layer of foam latex coextensive in area with said metal sheet-form member and being of identical thickness with said top cushioning member to provide a bottom shock absorber on the opposite side of said metal sheet-form member, means securing said sheet-form member and said top and bottom cushioning members in a unitary laminar assembly with said sheet-form member disposed intermediate said top and bottom cushioning members and said members together forming said ball portion, said shank portion and said heel portion of the reversible insole, and a pair of top and bottom smooth fabric covering members relatively thin with respect to said cushioning members and being coextensive in area therewith fastened on the outside of said top and bottom cushioning members, respectively, to provide identical reversible surfaces on the top and bottom sides of the ball portion, shank portion and heel portion of the reversible insole for engaging the foot of a user, or upon reversal, for engaging the insole of an article of footwear.

References Cited in the file of this patent

UNITED STATES PATENTS

| 113,773 | Johnson | Apr. 18, 1871 |
| 219,484 | Kanouse | Sept. 9, 1879 |
| 445,312 | French | Jan. 27, 1891 |
| 1,208,209 | Prince | Dec. 12, 1916 |
| 1,704,187 | Glidden et al. | Mar. 5, 1929 |
| 1,807,341 | Messler | May 26, 1931 |
| 2,276,949 | Everston | Mar. 17, 1942 |
| 2,284,947 | Clifford | June 2, 1942 |
| 2,348,336 | Everston | May 9, 1944 |
| 2,383,122 | Ghez et al. | Aug. 21, 1945 |
| 2,502,774 | Alianiello | Apr. 4, 1950 |
| 2,552,601 | Supple | May 15, 1951 |
| 2,563,092 | Zacks | Aug. 7, 1951 |
| 2,641,068 | Thompson | June 9, 1953 |

FOREIGN PATENTS

| 525 | Great Britain | Feb. 3, 1882 |
| 8,943 | Great Britain | Feb. 25, 1904 |
| 349,208 | Great Britain | May 28, 1931 |
| 519,411 | Germany | Feb. 27, 1931 |
| 705,294 | France | Mar. 3, 1931 |